US006611353B2

(12) United States Patent
Richards

(10) Patent No.: US 6,611,353 B2
(45) Date of Patent: Aug. 26, 2003

(54) METHOD FOR INCORPORATING MEDIA TYPE SENSING WITH SOFTWARE APPLICATIONS

(75) Inventor: Mark P. Richards, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/874,974

(22) Filed: Jun. 7, 2001

(65) Prior Publication Data

US 2002/0186385 A1 Dec. 12, 2002

(51) Int. Cl.[7] ............................ G06F 15/00; G06K 1/00

(52) U.S. Cl. ......................... 358/1.6; 358/1.1; 358/449; 358/1.15; 271/258.01; 399/386; 399/391

(58) Field of Search .......................... 358/1.6, 1.1, 449, 358/1.15; 271/258.01; 399/386, 391

(56) References Cited

U.S. PATENT DOCUMENTS 5,130,757 A * 7/1992 Ito .............................. 399/14
5,139,339 A * 8/1992 Courtney et al. ........... 356/446
5,459,580 A * 10/1995 Suzuki ....................... 358/296
5,548,406 A * 8/1996 Aihara ....................... 358/296
5,652,943 A * 7/1997 Matsuo ........................ 399/21
6,099,181 A * 8/2000 Kitabatake ................... 400/61
6,141,028 A * 10/2000 Aruga ........................ 347/193
6,246,776 B1 * 6/2001 Merz et al. ................. 358/296
6,336,705 B1 * 1/2002 Torigoe ...................... 347/100
6,351,320 B1 * 2/2002 Shin .......................... 358/1.16
6,386,676 B1 * 5/2002 Yang et al. ................... 347/19
2002/0051180 A1 * 5/2002 Shimbori et al. .......... 358/1.15

* cited by examiner

*Primary Examiner*—Edward Coles
*Assistant Examiner*—Ashanti Ghee

(57) ABSTRACT

A method of imaging an item is provided comprising the steps of determining a media type of a first portion of an item to be imaged, determining a media type of a supply of media for an imaging device, determining if the first portion media type is compatible with the first supply media type based on a criterion, and imaging the first portion on one or more sheets of the first supply media type using the imaging device if the first portion media type is compatible with the first supply media type. At least one of the determining steps is performed by sensing for multiple media types. Sensing the media type is preferably performed by at least one sensor.

28 Claims, 4 Drawing Sheets

METHOD FOR INCORPORATING MEDIA TYPE SENSING WITH SOFTWARE APPLICATIONS

BACKGROUND OF THE INVENTION

A. Field of the Invention

The invention relates generally to a system and method for incorporating media type sensing with software applications, and more specifically to a method for sensing a media type and imaging an item on a compatible media type.

B. Description of the Related Art

Presently, imaging devices such as photocopiers, fax machines, and printers image items on media with a variety of sizes and shapes. For example, when printing a document in a software application such as Microsoft Word®, a user can select to print on an 8½" by 11" paper or an A4 size paper. The printer first receives an imaging request for a first portion, in this example the first page of a document to be printed. If the printer has multiple trays of paper with different size paper in each tray, the printer then determines which supply contains the specified paper size and prints the page on the corresponding compatible paper size.

Common imaging devices, however, cannot determine which type of media is present in a supply. For example, printing a report with several different media types (glossy photos, transparencies, and handouts) cannot be printed on a common printer without manually feeding in each page of supply media, as the printer cannot determine which media types are present in its supply. Some printers, such as the Hp Laserjet 5 printer, can determine only one media type present in its supply. The Hp Laserjet 5 printer, using an optical sensor, can determine whether or not a transparency is present in its supply but cannot sense for multiple media types. While single media type sensing may be useful in applications where only one or two media types will likely be used, single media type sensing is not useful in applications where multiple media types may be used.

Similarly, present imaging devices such as photocopiers and fax machines cannot determine the media type to be imaged. For example, photocopying a transparency on a photocopier requires a user to select "transparency imaging" on the photocopier and manually feed in a transparency, to correctly adjust imaging parameters and compatible media type.

SUMMARY OF THE INVENTION

Briefly, in a first aspect of the present invention, a method of imaging an item is provided comprising the steps of determining a media type of a first portion of an item to be imaged, determining a media type of a supply of media for an imaging device, determining if the first portion media type is compatible with the first supply media type based on a criterion, and imaging the first portion on one or more sheets of the first supply media type using the imaging device if the first portion media type is compatible with the first supply media type. At least one of the determining steps is performed by sensing for multiple media types.

In a preferred first aspect, the method further comprises the step of notifying a user if the first supply media type is not compatible with the first portion media type.

In a further preferred first aspect, the method further comprises the steps of determining a second supply media type of a supply of media for an imaging device, and imaging the first portion on the second supply media type using the imaging device if the first portion media type is compatible with the second supply media type.

In a further preferred first aspect, the imaging device images the first portion on the first supply media type if the first portion media type is compatible with both the first supply media type and the second supply media type.

In a further preferred first aspect, the method further comprises the steps of determining a second portion media type of a second portion of an item to be imaged, determining if the second portion media type is compatible with the first supply media type based on a criterion, and imaging the second portion on the first supply media type if the first supply media type is compatible with the second portion media type.

In a further preferred first aspect, the step of determining a first portion media type is performed by at least one sensor, sensing a first media type for the first portion of an item to be imaged. The sensor comprises at least one of an optical sensor, a weight sensor, a reflectivity sensor, and a charge resistivity sensor.

In a further preferred first aspect, the criterion comprises at least one list containing a plurality of mediums identified as compatible media types.

In a second aspect of the present invention, a method of imaging an item with a first media type of a first portion different from a second media type of a second portion is provided comprising the steps of storing a first supply media type in a pre-determined tray of first supply media type, determining a first media type of a first portion of an item to be imaged, determining if the first media type is compatible with the first supply media type based on a criterion, imaging the first portion on the first supply media type using the imaging device if the first media type is compatible with the first supply media type, determining a second media type of a second portion of an item to be imaged, determining if the second media type is compatible with the first supply media type based on a criterion, and imaging the second portion on the first supply media type using the imaging device if the second media type is compatible with the first supply media type. The steps of determining a first media type and determining a second media type are performed by sensing the media type.

In a preferred second aspect, the imaging device is a photocopier.

In a third aspect of the present invention, a method of imaging an item is provided comprising the steps of receiving a first portion media type of a first portion of an item to be imaged, determining a first supply media type of a supply of media within an imaging device, determining if the first portion media type is compatible with the first supply media type based on a criterion, imaging the portion on the first supply media type using the imaging device if the first supply media type is compatible with the first portion media type. The step of determining a first supply media type is performed by sensing for multiple media types.

In a preferred third aspect, the imaging device is a printer.

In a fourth aspect of the present invention, a program product for imaging an item is provided comprising computer readable program code for carrying out the method steps determining a first media type of a first portion of an item to be imaged, determining a first supply media type of a supply of media for an imaging device, determining if the first media type is compatible with the first supply media type based on a criterion, and imaging the first portion on one or more sheets of the first supply media type using the imaging device if the first media type is compatible with the first supply media type. At least one of the determining steps is performed by sensing for multiple media types.

In a fifth aspect of the present invention, a system for imaging an item is provided comprising a first component to determine a first media type of a first portion of an item to be imaged, a second component to determine a first supply media type of a supply of media for an imaging device, a third component to determine if the first media type is compatible with the first supply media type based on a criterion, and an imaging component for imaging the first portion on one or more sheets of the first supply media type using the imaging device if the first media type is compatible with the first supply media type. At least one of the first and second components comprise a sensor for sensing for multiple media types.

In a sixth aspect of the present invention, a method of imaging an item is provided comprising the steps of sensing a media type of a first portion of an item to be imaged with at least one sensor, determining a media type of a supply of media for an imaging device, determining if the first portion media type is compatible with the first supply media type based on a criterion, and imaging the first portion on one or more sheets of the first supply media type using the imaging device if the first portion media type is compatible with the first supply media type. In a preferred sixth aspect, the imaging device is a photocopier.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

Figure 1:
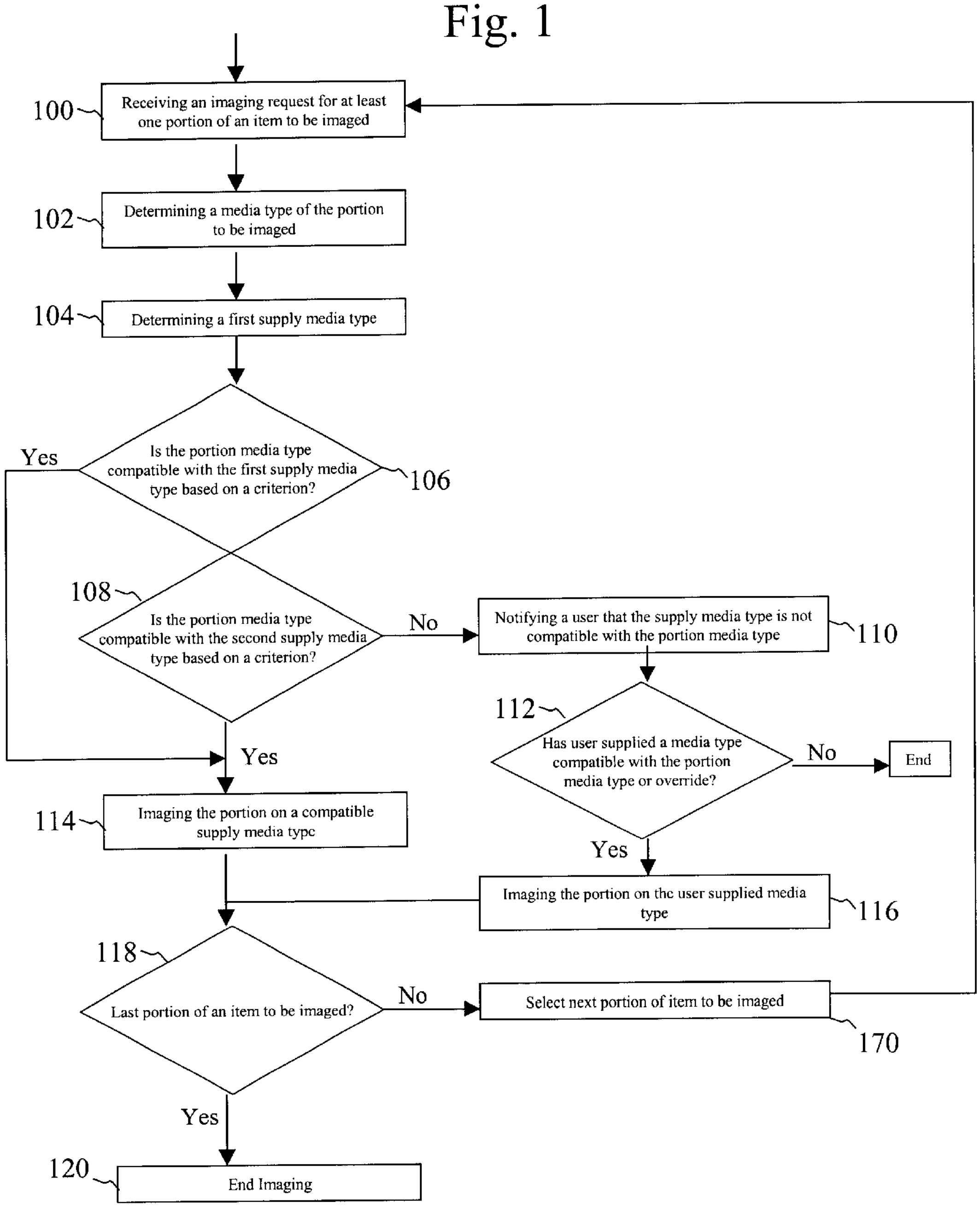
FIG. 1 is a flow chart of a first embodiment of a method for imaging an item according to the present invention.

Reference will now be made in detail to presently preferred embodiments of the invention. Wherever possible, the same reference numbers will be used throughout the drawings to refer to the same or like parts. The invention relates generally to a system and method for incorporating media type sensing with software applications, and more specifically to a method for sensing a media type and imaging an item on a compatible media type.

Recently, the introduction of devices such as digital cameras, recordable CDROMs and other devices have brought many new media types into common imaging requirements. These media types include, for example, high gloss photographic paper for devices such as digital cameras, label stock for items such as CDROMS, transparencies for devices such as overhead projectors, and more conventional media types such as corporate letterhead paper, high quality paper, cover stock, coated papers, films, envelopes and packaging feedstock. Imaging devices, such as conventional printers, are presently not designed to determine the type of media to be imaged or the supply of media to be imaged on. By way of example, a conventional printer cannot determine whether a supply contains 8½" by 11" standard paper, 8½" by 11" high gloss paper, 8½" by 11" label stock, or 8½" by 11" high quality paper.

Common items to be imaged include reports, proposals, presentations, brochures, flyers, newsletters, photographs, charts, presentations, manuals, and scanned or photographed objects and other documents. A portion of an item may include a first page of a document, for example. A portion of an item may further be a divisible portion of a page, such as a high gloss section for printing a logo or letterhead. By way of example, a report would thus likely contain multiple portion media types, possibly a first transparency or cover page, followed by multiple pages of photographs, followed by a coverstock of business cards.

Advances in sensor technology have greatly increased the ability to discern factors characteristic of different media types. Optical sensors, for example, may provide data regarding the transparency of a media to light, indicating the presence of a transparency media type. Reflectivity sensors may provide data regarding the amount of gloss present on a given media type, which may indicate the presence of a photographic media type. Charge resistivity sensors and weight sensors may provide data which may distinguish between various media types within a given category, for example a high gloss and medium gloss media type with different weights. Further, a sensor may be provided that can identify an identifying mark on a media type, wherein different media types are marked with discriminating marks. These marks may include, for example, an inked mark that disappears when heat is applied in an imaging process. Hence, sensor technology allows unprecedented determination of a media type not found within conventional imaging devices.

In one configuration, media type determination within a supply of a given media type may be performed by storing the media type in a pre-determined tray of that media type. Thus one configuration may comprise multiple pre-determined trays of media type, for example one tray of 8½" by 11" high gloss paper, and one tray of 8½" by 11" standard paper.

In another configuration, media type determination may be performed by a user supplying a media type to the imaging device. The imaging device may image the data on the user supplied media type, whereby the user determines the media type of the supply and the compatibility of the supply media with the item media.

Figure 4:
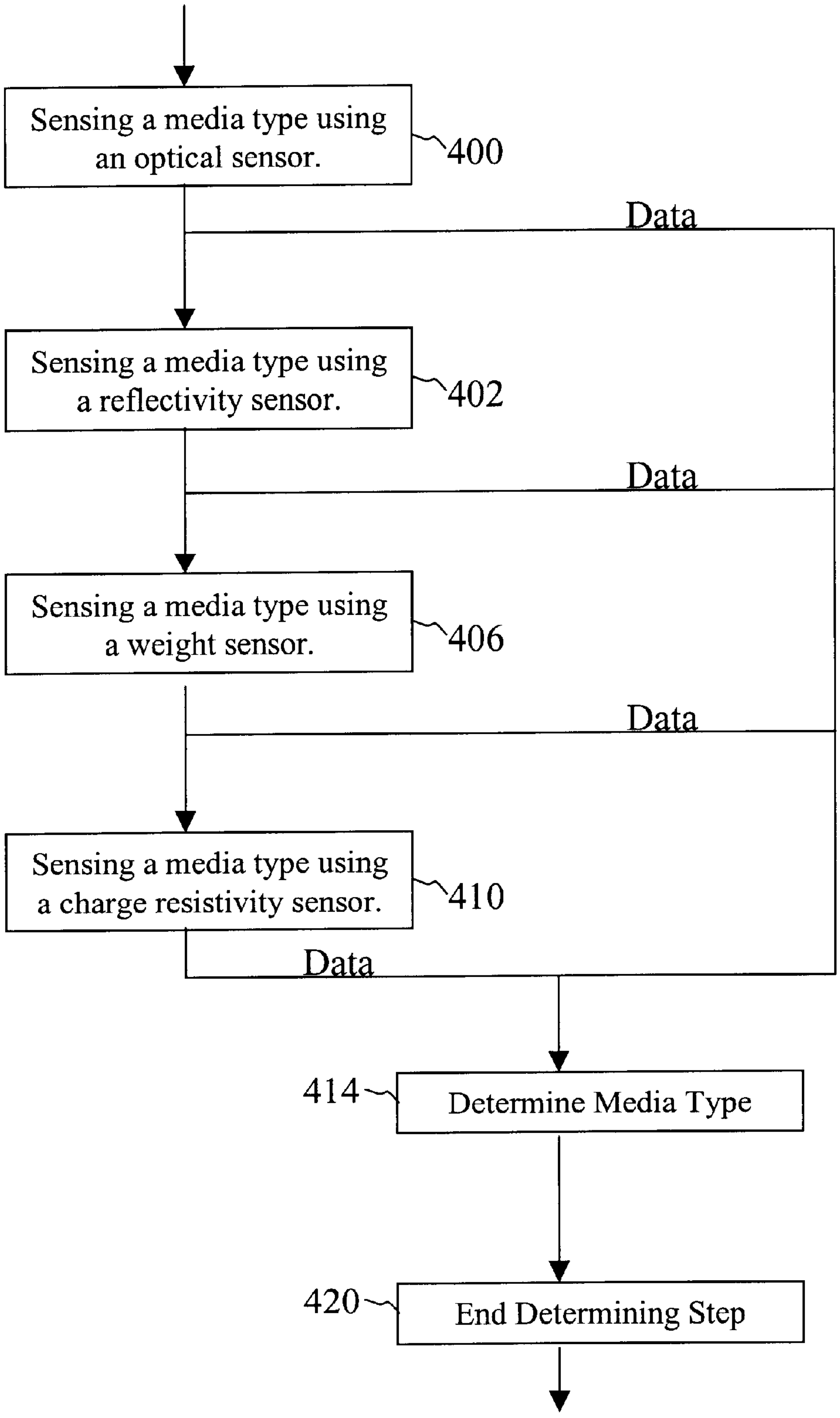
FIG. 4 is a flow chart of a preferred embodiment of determining a media type according to the present invention.

A preferred embodiment for determining a media type according to the present invention, is shown by the flow chart of FIG. 4. In this embodiment, the number of and types of sensors, and the order of sensing are illustrative only, and are not limiting on the scope of the invention. A media type is sensed using multiple sensors in blocks 400, 402, 406, and 410. Data is accumulated from each of the sensors, and utilized to determine the media type in block 414 (thereby completing the determination in step 420). By way of example, in an imaging device solely comprising transparencies and standard paper, only an optical sensor may be required to determine whether the media type is a transparency or standard paper. In an imaging device solely comprising photopaper, transparencies, and standard paper, for example, an optical sensor and a reflectivity sensor may provide enough data to determine which media type is present.

Sensor technology allows an imaging device to automatically determine the type of media in the item to be imaged, and select a compatible media type to image the item. Thus, imaging devices incorporating sensor technology are generally higher speed and easier to use than conventional imaging devices, by reducing the need for users to select and/or provide compatible media types when imaging an item.

The imaging device may further comprise at least one listing of compatible media types. For example, a list may indicate that medium or high gloss paper are compatible media types with photographic paper. The list may be pre-determined, or may be updated dynamically as new media types are introduced into the imaging device.

Media type determination has the advantage of allowing an imaging device to automatically select the proper media type for an item to be imaged, and/or to notify a user that the supply media type is not compatible with the portion media type to be imaged. Thus, a report containing photographs, transparencies, standard paper, and letterhead may be imaged without having to manually select or provide a compatible media type for each portion to be imaged. Further, an imaging device with a single tray, as is typical of home or small office printers, may be loaded with different media types in a pre-arranged bundle. This bundle, for example, may be pre-arranged to correspond to a report to be printed, wherein the printer senses the media type of the top media type and prints a portion of the report with a corresponding media type.

A first embodiment of a method for imaging an item is shown by the flow chart of FIG. 1. An imaging device receives an imaging request for a portion of an item to be imaged at block 100. Receiving an imaging request at block 100 may include, for example, a user selecting "copy" on a photocopy machine, a print request from a computer, an incoming fax or email.

The imaging device then determines an item media type of the portion to be imaged 102, and determines a first supply media type in block 104. Determining steps in blocks 102 and/or 104 may be performed by a variety of techniques as previously described. Other techniques for determining a media type may also be utilized as would be readily apparent to one skilled in the art after reading this disclosure.

The imaging device then determines if the portion media type is compatible with the first supply media type based on a criterion in block 106. This criterion may include at least one pre-determined list of compatible media types as previously described. By way of example, a pre-determined list may specify that high gloss photographic paper and low gloss photographic paper are compatible media types if only one supply of photographic paper is accessible by the imaging device. If the portion media type is compatible with the first supply media type, the imaging device images the portion on the first supply media type in block 114.

Optionally, if the media type is not compatible with the first supply media type and the imaging device comprises a second supply media type, the imaging device then determines if the portion media type is compatible with the second supply media type based on a criterion 108.

If the portion media type is not compatible with a supply media type present in the imaging device, the imaging device in block 110 may notify a user via a display, email or other convenient mode of communication, that the supply media type is not compatible with the portion media type. The user may then supply a media type compatible with the portion media type in block 112 or override the system. The imaging device then images the portion on the user supplied media type in block 116, or on the originally supplied media if there is a user override. In one embodiment, user supplied media may be dynamically added to a compatibility list for the determination criterion if a compatibility list exists.

If the imaged portion is the last portion of an item to be imaged 118, such as the last page of a report, the imaging device ends imaging at block 120. Otherwise, the imaging device at block 170 selects the next portion of the item to be imaged, and receives an imaging request for another portion to be imaged in block 100.

Figure 2:
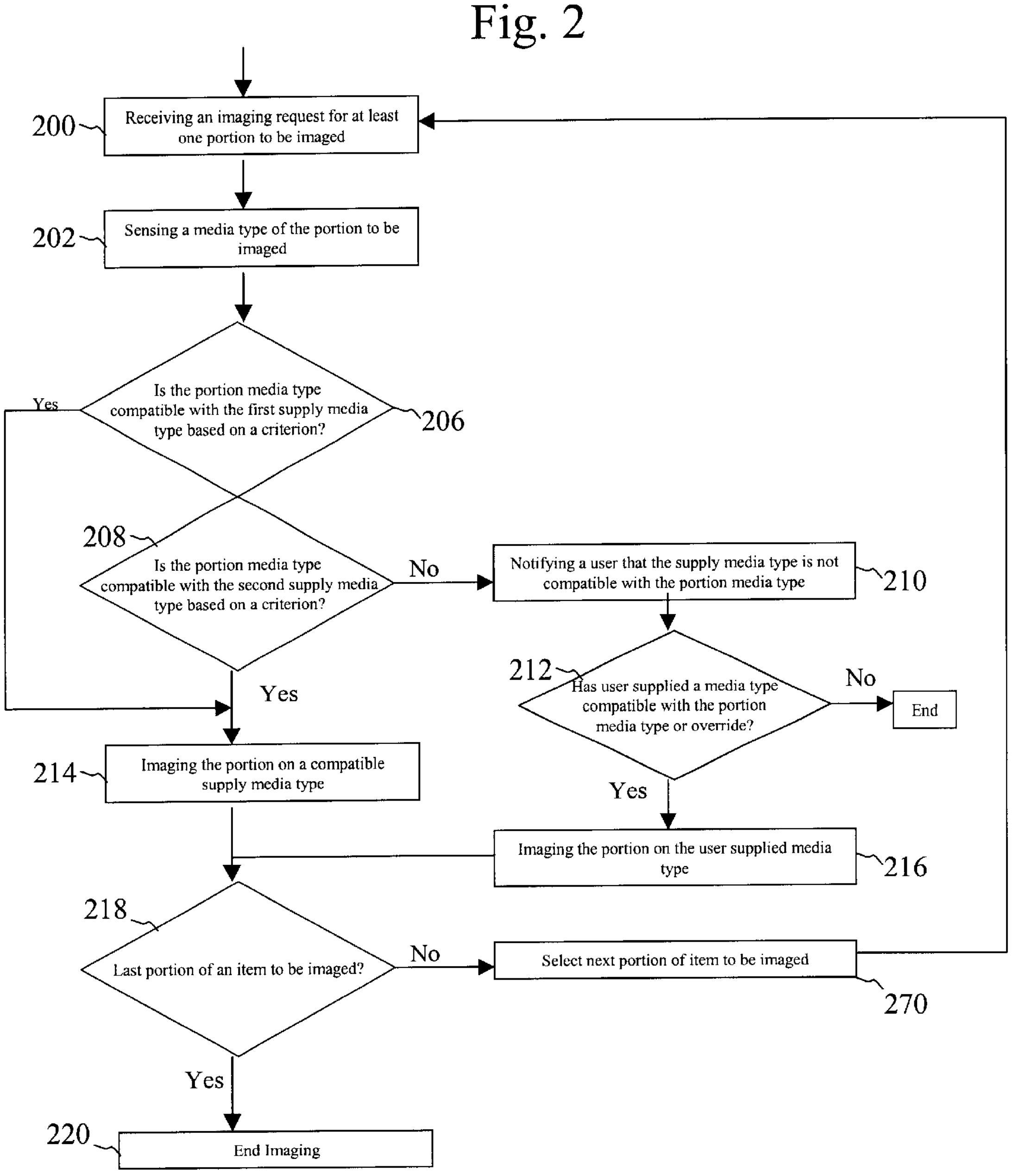
FIG. 2 is a flow chart of a second embodiment of a method for imaging an item according to the present invention.

A second embodiment of a method for imaging an item is shown by the flow chart of FIG. 2. This second embodiment is similar to the first embodiment. The imaging device first receives a print request at block 200, and then proceeds to block 202 where it senses a media type of the portion to be imaged. In one embodiment, the imaging device performs the step of determining a first supply media type (104 in FIG. 1) by storing the supply media type in a pre-determined tray of supply media type. Typically, the step of determining a first supply media type may be performed at any time prior to determining whether the portion media type is compatible with the first supply media type based on a criterion at block 206.

Sensing an item media type of the portion to be imaged in block 202 may be performed by at least one sensor. As aforementioned, these sensor(s) may include at least one of an optical sensor, a weight sensor, a reflectivity sensor, and a charge resistivity sensor, or any other appropriate sensor.

In practice, an imaging request for at least one portion to be imaged is received at block 200 by an imaging device such as a photocopier or fax machine. The imaging device then senses an item media type of the portion to be imaged in block 202. For example, an optical sensor on a photocopier may sense that a page being photocopied is a transparency.

The imaging device then determines if the portion media type is compatible with the first supply media type based on a criterion in block 206. If the portion media type is compatible with the supply media type based on a criterion, the imaging device images the portion on a compatible supply media type in block 214. If the imaging device is provided with multiple (e.g., a second) supplies of media, the imaging device may then determine if the portion media type is compatible with the second supply media type based on a criterion in block 208. If both are compatible, the imaging device may default to the first supply media type. If the portion media type is not compatible with the first (or second if provided) supply media type, the device may notify a user that the supply media type is not compatible with the portion media type at block 210 and allow a user to supply a media type compatible with the portion media type and/or override the non-compatibility at block 212. The imaging device may then image the portion at block 216 on the user supplied media type if provided unless an override has been entered.

Similar to the first embodiment, after imaging a portion in block 214 or 216, the imaging device then determines if the portion is the last portion of an item to be imaged in block 218. If it is the last portion to be imaged, the imaging device then ends imaging at block 220. If not, the imaging device then selects the next portion of the item to be imaged in block 270 and proceeds back to block 200 where it receives the next imaging request for a portion to be imaged.

Figure 3:
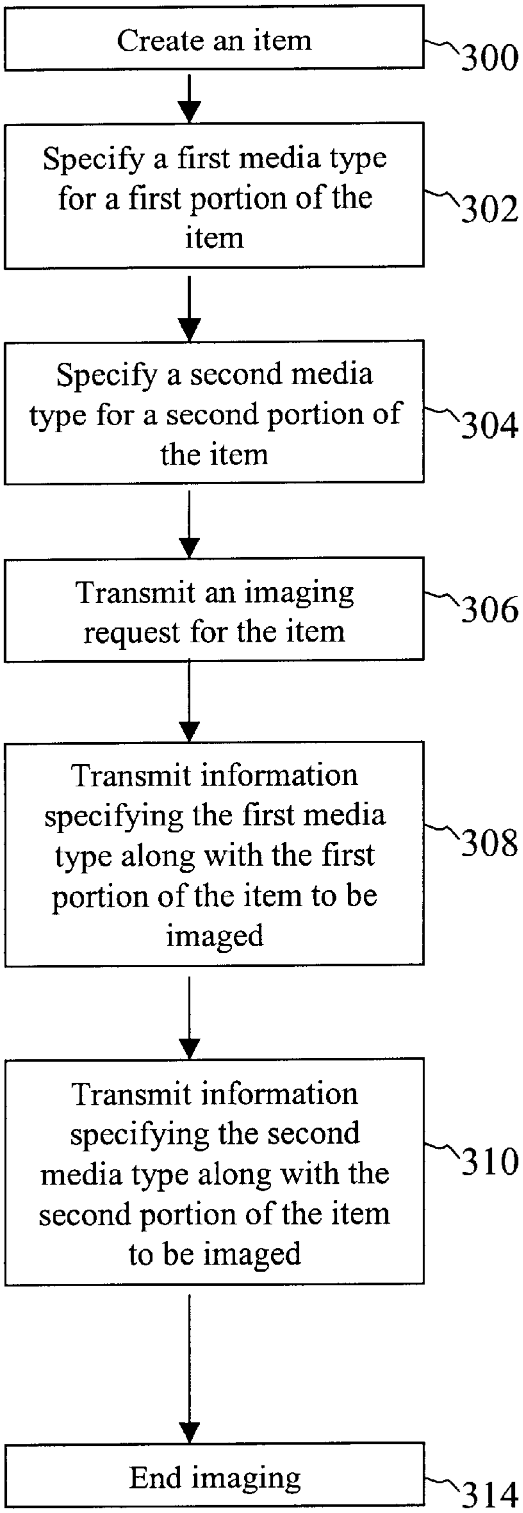
FIG. 3 is a flow chart of a third embodiment of a method for imaging an item according to the present invention.

A third embodiment of a method for imaging an item is shown by the flow chart of FIG. 3. First, an item is created in block 300 using, for example, a word processing application such as Microsoft Word® or Corell Wordperfect®. A first item media type is specified for a first portion of the item in block 302, in this example by selecting a media type in a menu within the application. Selecting a media type may include selecting one of a list of media types from a menu, as is currently done for paper size in the page configuration menu of Microsoft Word 2000®.

Alternatively, the application may sense the file type, such as a bitmap ("bmp file") or letterhead, and suggest a media type (glossy paper for bitmap picture files) in a media type wizard. Wizard implementation may examine file extensions (.bmp, .doc, etc.) when a file is inserted into a document. The application may further sense the file type using a scanner or digital camera assessable to the application, wherein a portion is scanned in or copied to the application. By way of example, Adobe Photodeluxe® is a common photo-editing application that may be enhanced by this configuration. If the item created in block 300 comprises more than one item media type, a second item media type may be specified in block 304 in a similar manner.

To image the item, an imaging request for the item is transmitted in block 306 to an imaging device, such as a printer or fax machine. Information specifying the first item media type is transmitted along with the first portion of the item to be imaged in block 308. If the item created in block 300 comprises more than one item media type, the second item media type is transmitted in block 310 in a similar manner. This process continues until the entire item to be imaged has been transmitted to the imaging device, ending the imaging at block 314.

Thus, improvements in item imaging has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. A method of imaging an item, comprising:

determining a media type of a first portion of an item to be imaged;

determining a media type of a first supply of media for an imaging device;

determining if the first portion media type is compatible with the first supply media type based on a criterion; and imaging the first portion on one or more sheets of the first supply media type using the imaging device if the first portion media type is compatible with the first supply media type, wherein at least one of determining a media type of a first portion and determining a media type of a first supply is performed by sensing for multiple media types, and wherein a media type comprises one of transparencies, film, cover stock, coated papers, standard paper, high quality paper, photographic paper, label stock, and envelopes.

2. The method of claim 1, further comprising: notifying a user if the first supply media type is not compatible with the first portion media type.

3. The method of claim 1, further comprising:

determining a second supply media type of a second supply of media for the imaging device; and imaging the first portion on one or more sheets of the second supply media type using the imaging device if the first portion media type is compatible with the second supply media type.

4. The method of claim 3, wherein the imaging device images the first portion on the first supply media type if the first portion media type is compatible with both the first supply media type and the second supply media type.

5. The method of claim 1, further comprising:

determining a second portion media type of a second portion of the item to be imaged;

determining if the second portion media type is compatible with the first supply media type based on a criterion; and imaging the second portion on the first supply media type if the first supply media type is compatible with the second portion media type.

6. The method of claim 1, wherein the first supply media type is positioned within the imaging device.

7. The method of claim 1, wherein determining a first supply media type is performed by storing the first supply media type in a pre-determined tray of first supply media type.

8. The method of claim 1, wherein determining a first portion media type is performed by a user selecting a media type for a portion of an application to be imaged.

9. A method of imaging an item, comprising:

receiving information specifying a page media type of a first page of an item to be imaged;

determining a supply media type of a supply of media for an imaging device;

determining if the page media type is compatible the supply media type based on a criterion; and printing said first page of the item to be imaged on the supply media type if the page media type is compatible with the supply media type, wherein determining a supply media type is performed by sensing for multiple media types, and wherein a media type comprises one of transparencies, film, cover stock, coated papers, standard paper, high quality paper, photographic paper, label stock, and envelopes.

10. The method of claim 9, wherein the imaging device is a printer.

11. The method of claim 1, wherein determining a media type of a first portion is performed by at least one sensor, sensing the media type of the first portion of the item to be imaged.

12. The method of claim 11, wherein the at least one sensor comprises at least one of an optical sensor, a weight sensor, a reflectivity sensor, and a charge resistivity sensor.

13. The method of claim 11, wherein the imaging device is a photocopier.

14. The method of claim 11, wherein the imaging device is a fax machine.

15. A method of imaging an item, comprising:

determining a media type of a first portion of an item to be imaged;

determining a media type of a first supply of media for a fax machine;

determining if the first portion media type is compatible with the first supply media type based on a criterion; and imaging the first portion on one or more sheets of the first supply media type using the fax machine if the first portion media type is compatible with the first supply media type, wherein at least one of determining a media type of a first portion and determining a media type of a first supply is performed by sensing for multiple media types, and wherein imaging the first portion on the first supply media type comprises transmitting determined information on the media type along with the first portion to be imaged to the fax machine.

16. The method of claim 1, wherein sensing for multiple media types is performed by at least one sensor that can identify an identifying mark on a media.

17. The method of claim 1, wherein the criterion comprises at least one list containing a plurality of mediums identified as compatible media types.

18. A method of imaging an item, comprising:

determining a media type of a first portion of an item to be imaged;

determining a media type of a first supply of media for an imaging device;

determining if the first portion media type is compatible with the first supply media type based on a criterion; and imaging the first portion on the first supply media type using the imaging device if the first portion media type is compatible with the first supply media type, wherein at least one of determining a media type of a first portion and determining a media type of a first supply is performed by sensing for multiple media types, wherein the first portion media type is different than a second portion media type of a second portion of the item to be imaged, and wherein a media type comprises one of transparencies, film, cover stock, coated papers, standard paper, high quality paper, photographic paper, label stock, and envelopes.

19. The method of claim 1, wherein both determining a media type of a first portion and determining a media type of a first supply are performed by sensing the media type.

20. A method of imaging an item with a first portion media type of a first portion different from a second portion media type of a second portion, comprising:

storing a first supply media type in a pre-determined tray of first supply media type in an imaging device;

determining the first portion media type of the first portion of the item to be imaged;

determining if the first portion media type is compatible with the first supply media type based on a criterion;

imaging the first portion of the item on the first supply media type using the imaging device if the first portion media type is compatible with the first supply media type;

determining the second portion media type of the second portion of the item to be imaged;

determining if the second portion media type is compatible with the first supply media type based on a criterion; and imaging the second portion of the item on the first supply media type using the imaging device if the second portion media type is compatible with the first supply media type, wherein determining a first portion media type and determining a second portion media type are performed by sensing the media type, and wherein a media type comprises one of transparencies, film, cover stock, coated papers, standard paper, high quality paper, photographic paper, label stock, and envelopes.

21. The method of claim 20, wherein the imaging device is a photocopier.

22. The method of claim 20, wherein the imaging device is a fax machine.

23. The method of claim 20, further comprising:

determining a second supply media type of a second supply of media for the imaging device; and imaging the first portion of the item on the second supply media type using the imaging device if the first portion media type is compatible with the second supply media type.

24. A method of imaging an item, comprising:

receiving a first portion media type of a first portion of an item to be imaged;

determining a first supply media type of a supply of media within an imaging device;

determining if the first portion media type is compatible with the first supply media type based on a criterion; and imaging the first portion on the first supply media type using the imaging device if the first supply media type is compatible with the first portion media type, wherein determining a first supply media type is performed by sensing for multiple media types, and wherein a media type comprises one of transparencies, film, cover stock, coated papers, standard paper, high quality paper, photographic paper, label stock, and envelopes.

25. The method of claim 24, wherein the imaging device is a printer.

26. A program product for imaging an item, comprising computer readable program code for:

determining a first portion media type of a first portion of an item to be imaged;

determining a first supply media type of a supply of media for an imaging device;

determining if the first portion media type is compatible with the first supply media type based on a criterion; and imaging the first portion on one or more sheets of the first supply media type using the imaging device if the first portion media type is compatible with the first supply media type, wherein at least one of determining a first portion media type and determining a first supply media type is performed by sensing for multiple media types, and wherein a media type comprises one of transparencies, film, cover stock, coated papers, standard paper, high quality paper, photographic paper, label stock, and envelopes.

27. A system for imaging an item, comprising:

a first component to determine a first portion media type of a first portion of an item to be imaged;

a second component to determine a first supply media type of a supply of media for an imaging device;

a third component to determine if the first portion media type is compatible with the first supply media type based on a criterion; and an imaging component for imaging the first portion on one or more sheets of the first supply media type using the imaging device if the first portion media type is compatible with the first supply media type, wherein at least one of the first and second components comprise a sensor for sensing for multiple media types, and wherein a media type comprises one of transparencies, film, cover stock, coated papers, standard paper, high quality paper, photographic paper, label stock, and envelopes.

28. A method of imaging an item, comprising:

sensing a first portion media type of a first portion of an item to be imaged with at least one sensor;

determining a first supply media type of a supply of media for an imaging device;

determining if the first portion media type is compatible with the first supply media type based on a criterion; and imaging the first portion on one or more sheets of the first supply media type using the imaging device if the first portion media type is compatible with the first supply media type, and wherein a media type comprises one of transparencies, film, cover stock, coated papers, standard paper, high quality paper, photographic paper, label stock, and envelopes.

* * * * *